UNITED STATES PATENT OFFICE.

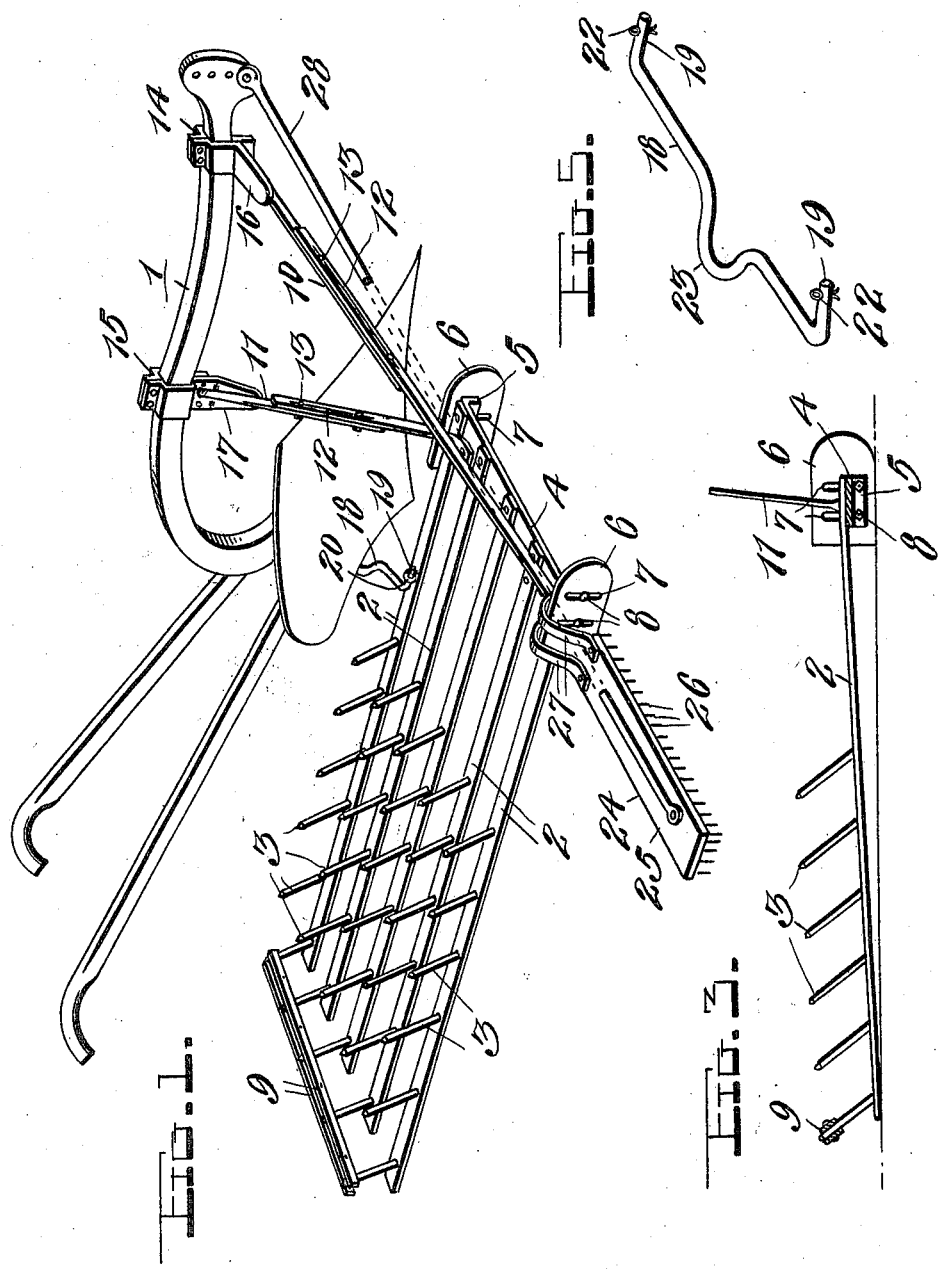

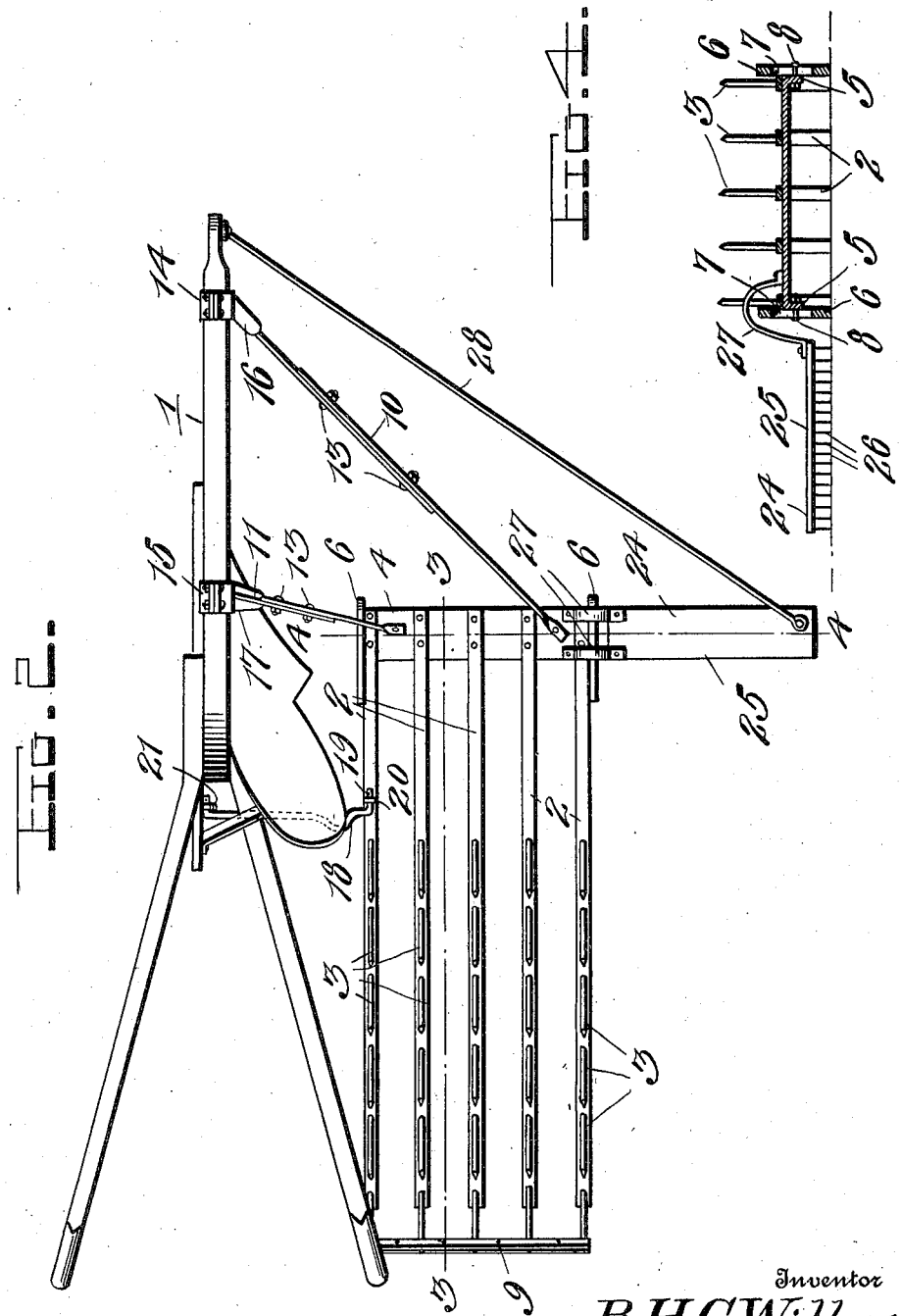

BELDEN H. G. WILBUR, OF COLORADO SPRINGS, COLORADO, ASSIGNOR OF ONE-THIRD TO GEORGE S. ELSTUN, OF COLORADO SPRINGS, COLORADO.

HARROW ATTACHMENT FOR PLOWS.

998,823.      Specification of Letters Patent.      Patented July 25, 1911.

Application filed October 17, 1910. Serial No. 587,473.

*To all whom it may concern:*

Be it known that I, BELDEN H. G. WILBUR, a citizen of the United States, residing at Colorado Springs, in the county of El Paso and State of Colorado, have invented certain new and useful Improvements in Harrow Attachments for Plows; and I do declare the following to be a full, clear, and exact description of the invention, such as will enable others skilled in the art to which it appertains to make and use the same.

This invention relates to improvements in harrow attachments for plows.

One object of the invention is to provide an improved construction and arrangement of harrow and means whereby the same may be attached to a plow in such manner that the harrow is drawn along in the furrows formed by the plow and thus pulverizes the soil to the depth at which the same is worked by the plow.

Another object is to provide means for attaching the harrow to the plow whereby when the latter may be turned slightly without interfering with the movement of the harrow and whereby when the plow is further tilted the harrow may be raised above the ground to facilitate the turning of the plow at the end of the rows or for any other purpose.

With the foregoing and other objects in view, the invention consists of certain novel features of construction, combination and arrangements of parts as will be more fully described and particularly pointed out in the appended claims.

In the accompanying drawings: Figure 1 is a perspective view of a plow showing my improved harrow attached thereto; Fig. 2 is a plan view of the same; Fig. 3 is a longitudinal sectional view of the harrow on the line 3—3 of Fig. 2; Fig. 4 is a cross sectional view of a harrow on the line 4—4 of Fig. 2; Fig. 5 is a detail perspective view of one of the harrow connecting bars.

Referring more particularly to the drawings, 1 denotes a plow which may be of any desired construction and to which is connected my improved harrow.

The harrow comprises a series of longitudinally disposed parallel tooth bars 2 to which are secured a series of upwardly projecting teeth 3, said teeth being preferably arranged at an angle and inclined slightly toward the rear end of the harrow. The tooth bars 2 are connected at their forward ends to a head plate or connecting bar 4 the opposite ends of which are bent downwardly at right angles to form runner attaching flanges 5 to which are adjustably connected short runners 6. The runners 6 may be adjustably connected to the flanges 5 in any suitable manner, said runners being shown in the present instance as having formed therein pairs of vertically disposed slots 7 in which are arranged clamping bolts 8 which are engaged with the flanges 5 and provided with nuts whereby the runners may be clamped into tight engagement with the flanges after being adjusted to support the forward end of the harrow at the desired elevation.

The tooth bars 2 are spaced apart and secured together at their rear ends by a pair of clamping bars 9 which are engaged with the upper ends of the rear series of teeth 3 and are bolted or otherwise secured to the teeth thereby rigidly holding the rear ends of the tooth bars in spaced relation.

The harrow is adjustably secured to the plow by means of attaching bars 10 and 11. The bars 10 and 11 are formed in overlapping sections, the overlapping end of one section having formed therein a longitudinal slot 12 with which are engaged clamping bolts 13 arranged in the engaging or overlapping portion of the opposite section thereby permitting said bars to be lengthened or shortened to space the harrow the desired distance from the plow. The outer ends of the bars 10 and 11 are bolted or otherwise secured to the connecting bar 4 of the harrow while the inner ends of said bars are loosely engaged with clips 14 and 15 secured to the beam of the plow as shown. The clip engaging ends of the bars 10 and 11 are rounded and threaded and loosely engage passages formed in the lower portion of the clips and have on their threaded outer ends retaining nuts whereby the bars are connected to the clips. On the clip 14 is formed a laterally projecting lug 16 which projects above the upper side of the bar 10 while the clip 15 is provided with a laterally projecting lug 17 which projects beneath the outer side of the bar 11. By thus loosely connecting the inner ends of the bars 10 and 11 with the clips 14 and 15 the plow may be tilted in the furrow to a slight extent. When however the plow is tilted to a greater extent or swung over on one side the lug 17 will be brought into engagement with the under side of the bar 11 and thereby lift the harrow out of engagement with the ground thus facilitating the turning of the plow at the end of the furrow or moving the same from one field to another.

In addition to the attaching bars 10 and 11 the harrow is also provided with a rear attaching bar 18 having formed on its opposite ends hooks 19, one of which is adapted to be engaged with an eye 20 arranged on the inner toothed bar of the harrow, while the hook at the opposite end of the bar is adapted to be engaged with a similar eye 21 arranged on the land side of the plow as shown. The hooked ends of the bar 18 may be held in engagement with the eyes 20 and 21 by cotter pins or other suitable fastening devices 22. In the bar 18 is formed a curve or loop 23 which is adapted to engage the lower edge of the mold board of the plow and thus hold the harrow down in the furrow which has been formed by the previous round of the plow, so that the dirt turned over by the mold board will be thrown onto the front portions of the tooth bars which are not provided with teeth. When the dirt has thus been thrown or turned over onto the front portion of the harrow by the mold board the teeth of the rear ends of the bars will be drawn through this dirt thereby thoroughly pulverizing and working the same to the entire depth of the furrow.

In addition to the main harrow I may provide a light smoothing harrow 24 comprising a back plate or board 25 having secured to its under side a series of harrow teeth 26. The harrow 24 is arranged at the forward end of and projects laterally beyond the outer side of the main harrow and is connected to the cross bar 4 of the latter by curved spring metal connecting bars 27 as shown. The outer end of the harrow 24 is connected to the forward end of the plow beam by a connecting rod 28.

While I have here shown and described my improved harrow as attached to the beam of a walking plow it is obvious that the harrow may be connected in any suitable manner to any kind of a walking or riding plow whereby the dirt will be thoroughly pulverized to the entire depth at which the same is worked by the plow.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A harrow attachment for plows comprising a series of tooth bars, a series of upwardly projecting teeth arranged on said bars, a cross bar to secure said tooth bars in position to form a harrow, clamping bars secured to the free upper ends of the rear series of teeth to hold said bars together in spaced relation, and means for connecting the harrow to a plow in position to receive the dirt thrown up by the mold board of the plow.

2. In an attachment of the character described, a harrow comprising a series of longitudinally disposed tooth bars, a series of upwardly projecting teeth arranged on said bars, a cross bar to secure the forward ends of said tooth bars in position to form the harrow, clamping bars secured to the rear series of teeth to hold said bars together in spaced relation at their rear ends and adjustable attaching bars adapted to connect the harrow to the plow in position to receive the dirt thrown up by the mold board of the plow.

3. In a harrow attachment for plows, a harrow comprising a series of tooth bars, a cross bar to connect the forward ends of said bars together in operative position, a series of upwardly projecting rearwardly inclined teeth arranged on said bars, means to connect the rear ends of the bars together, a pair of runners adjustably connected to the outer ends of said front cross bar whereby the front end of the harrow is adjustably supported, adjustable attaching bars adapted to loosely connect the front end of the harrow to the plow whereby said harrow is held in position to receive the dirt thrown up by the mold board of a plow and whereby the harrow may be raised out of engagement with the ground when the plow is tilted, and a connecting bar adapted to secure the harrow to the rear portion of the plow and to hold the plow down in the furrow.

4. In a harrow attachment for plows, a harrow comprising a series of tooth bars, a cross bar to connect the forward ends of said tooth bars together, runners adjustably connected to the opposite ends of said cross bar, a series of teeth arranged on and projecting upwardly from said bars, adjustable attaching bars adapted to connect said harrow to the plow, said bars being formed in overlapping sections, one of which is provided with a longitudinally disposed slot, clamping bolts arranged in the opposite overlapping sections and adapted to engage said slot whereby the bars may be lengthened or shortened, attaching clips arranged on the plow, said clips having formed therein apertures to receive the inner ends of said attaching bars whereby the latter are loosely connected to the plow, laterally projecting lugs formed on said clips and adapted to be engaged with said bars when the plow is tilted thereby lifting the harrow out of engagement with the ground, and means whereby the harrow is held down in the furrow and in position to receive the dirt thrown up by the mold board of the plow whereby the dirt is pulverized to the entire depth that the same is worked by the plow.

5. In a harrow attachment for plows, a main harrow comprising a series of tooth bars, a cross bar, to operatively connect the forward ends of said tooth bars together, a series of teeth arranged on the rear portion of said tooth bars, means to adjustably connect said harrow to the plow, a light smoothing harrow, and means to yieldingly connect said smoothing harrow to the forward end of said main harrow.

In testimony whereof I have hereunto set my hand in presence of two subscribing witnesses.

BELDEN H. G. WILBUR.

Witnesses:
  MONROE I. MADDEN,
  ROBERT W. ELSTUN.

Copies of this patent may be obtained for five cents each, by addressing the "Commissioner of Patents, Washington, D. C."